(12) United States Patent
Tweedie et al.

(10) Patent No.: US 11,317,710 B2
(45) Date of Patent: May 3, 2022

(54) CLEANING APPLIANCE

(71) Applicant: Dyson Technology Limited, Wiltshire (GB)

(72) Inventors: Robert Lawrence Tweedie, Swindon (GB); Christopher Graham Vincent, Swindon (GB); Thomas James Dunning Follows, Swindon (GB); James David Coleman, Bristol (GB); Andrew Nicholas Walton, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 345 days.

(21) Appl. No.: 15/794,738

(22) Filed: Oct. 26, 2017

(65) Prior Publication Data

US 2018/0116390 A1 May 3, 2018

(30) Foreign Application Priority Data

Oct. 28, 2016 (GB) ..................... 1618246

(51) Int. Cl.
*A61C 17/02* (2006.01)
*A61C 17/028* (2006.01)
(Continued)

(52) U.S. Cl.
CPC ................ *A46B 13/04* (2013.01); *A46B 9/04* (2013.01); *A46B 11/002* (2013.01);
(Continued)

(58) Field of Classification Search
CPC ..... A61C 17/00; A61C 17/024; A61C 17/028; A61C 17/227; A61C 5/00; A61C 5/47;
(Continued)

(56) References Cited

U.S. PATENT DOCUMENTS 3,227,158 A * 1/1966 Mattingly ............ A61C 1/0092
601/162
3,273,189 A 9/1966 Levinson et al.
(Continued)

FOREIGN PATENT DOCUMENTS

CH 632 662 10/1982
CN 104224366 A 12/2014
(Continued)

OTHER PUBLICATIONS

Search Report dated Mar. 9, 2017, directed to GB Application No. 1618246.1; 1 page.
(Continued)

*Primary Examiner* — Justine R Yu
*Assistant Examiner* — Christopher E Miller
(74) *Attorney, Agent, or Firm* — Faegre Drinker Biddle & Reath LLP

(57) ABSTRACT

A fluid delivery system for a dental cleaning appliance includes a nozzle for delivering a burst of working fluid to the teeth of a user, and a fluid conduit for conveying working fluid to the nozzle. A body of the nozzle defines a fluid chamber and a channel for conveying working fluid from the fluid chamber to a fluid outlet from the nozzle. The fluid chamber has a tangential inlet for receiving working fluid from the fluid conduit.

29 Claims, 9 Drawing Sheets

(51) Int. Cl.
*A46B 13/04* (2006.01)
*A46B 9/04* (2006.01)
*A46B 11/00* (2006.01)
*A61C 5/50* (2017.01)

(52) U.S. Cl.
CPC ...... *A46B 11/0062* (2013.01); *A61C 17/0202* (2013.01); *A61C 5/50* (2017.02)

(58) Field of Classification Search
CPC ............. A61H 13/00; A61H 13/005; A61H 7/00–005; A61H 9/00; A61H 9/0007; A61H 9/0021; A61H 2201/12–1292; A61H 2201/14–149
See application file for complete search history.

(56) References Cited

U.S. PATENT DOCUMENTS

| | | | |
|---|---|---|---|
| 3,465,751 A | 9/1969 | Powers | |
| 3,487,828 A * | 1/1970 | Troy | A61C 17/0202 601/162 |
| 3,736,923 A * | 6/1973 | Parkison | A61C 17/028 601/163 |
| 3,739,983 A | 6/1973 | Jousson | |
| 3,973,558 A | 8/1976 | Stouffer et al. | |
| 4,422,450 A * | 12/1983 | Rusteberg | A61H 13/005 601/154 |
| 4,489,750 A * | 12/1984 | Nehring | A61C 17/028 137/496 |
| 4,540,365 A | 9/1985 | Nelson et al. | |
| 4,671,259 A | 6/1987 | Kirchner | |
| 5,334,019 A | 8/1994 | Goldsmith et al. | |
| 5,616,028 A * | 4/1997 | Hafele | A61C 17/02 433/80 |
| 5,800,367 A | 9/1998 | Saxer et al. | |
| 5,860,942 A * | 1/1999 | Cox | A61C 17/0202 601/155 |
| 6,245,032 B1 * | 6/2001 | Sauer | A61C 17/02 433/80 |
| 6,257,886 B1 * | 7/2001 | Warner | A61C 17/005 433/125 |
| 6,422,865 B1 * | 7/2002 | Fischer | A61C 17/02 433/81 |
| 6,766,549 B2 | 7/2004 | Klupt | |
| 8,458,841 B2 * | 6/2013 | Haas | A61C 17/222 15/29 |
| 8,522,384 B2 | 9/2013 | Leung | |
| 9,987,109 B2 * | 6/2018 | Sokol | A61C 17/36 |
| 2002/0152565 A1 | 10/2002 | Klupt | |
| 2005/0175960 A1 | 8/2005 | Wiek et al. | |
| 2006/0057539 A1 | 3/2006 | Sodo | |
| 2006/0097084 A1 | 5/2006 | Gromer et al. | |
| 2007/0202459 A1 | 8/2007 | Boyd et al. | |
| 2009/0001196 A1 | 1/2009 | Grez | |
| 2010/0152634 A1 * | 6/2010 | Dove | A61H 13/005 601/162 |
| 2010/0223742 A1 | 9/2010 | Kang | |
| 2010/0269279 A1 | 10/2010 | Haas et al. | |
| 2011/0027746 A1 | 2/2011 | McDonough et al. | |
| 2011/0117517 A1 | 5/2011 | Bergheim et al. | |
| 2012/0141953 A1 * | 6/2012 | Mueller | B24C 5/04 433/88 |
| 2012/0183926 A1 * | 7/2012 | Shalev | A61C 17/0202 433/215 |
| 2013/0177868 A1 | 7/2013 | Defenbaugh et al. | |
| 2014/0045140 A1 * | 2/2014 | Soyama | A61C 17/0211 433/82 |
| 2014/0259474 A1 * | 9/2014 | Sokol | A61C 17/0202 15/22.2 |
| 2014/0322667 A1 * | 10/2014 | Kloster | A61C 17/0202 433/84 |
| 2014/0349246 A1 * | 11/2014 | Johnson | A61C 17/02 433/80 |
| 2015/0010882 A1 * | 1/2015 | Bergheim | A61C 5/40 433/80 |
| 2015/0044631 A1 | 2/2015 | Lifshitz et al. | |
| 2015/0164612 A1 * | 6/2015 | Kloster | A61C 1/0092 433/90 |
| 2015/0289957 A1 * | 10/2015 | Zhadanov | A61C 17/028 433/89 |
| 2016/0095679 A1 | 4/2016 | Khakpour et al. | |
| 2016/0310242 A1 | 10/2016 | Uchitel et al. | |
| 2017/0007384 A1 | 1/2017 | Wagner | |
| 2018/0116390 A1 | 5/2018 | Tweedie et al. | |
| 2019/0117354 A1 * | 4/2019 | Sodo | A61C 17/222 |

FOREIGN PATENT DOCUMENTS

| | | |
|---|---|---|
| GB | 1328551 | 8/1973 |
| GB | 2538303 | 11/2016 |
| JP | 10-113230 | 5/1998 |
| JP | 2000-279852 | 10/2000 |
| KR | 10-2012-0126271 A | 11/2012 |

OTHER PUBLICATIONS

International Search Report and Written Opinion dated Dec. 21, 2017, directed to International Application No. PCT/GB2017/053140; 14 pages.

Evaluation Report dated Sep. 23, 2019, directed to CN Utility Model Application No. ZL2017214320555; 12 pages.

The First Office Action dated Jan. 2, 2020, directed to CN Application No. 201711037496.X; 28 pages.

Notification of Reason for Refusal dated Nov. 30, 2020, directed to KR Application No. 10-2019-7012758; 17 pages.

\* cited by examiner

CLEANING APPLIANCE

REFERENCE TO RELATED APPLICATIONS

This application claims the priority of United Kingdom Application No. 1618246.1, filed Oct. 28, 2016, the entire contents of which are incorporated herein by reference.

FIELD OF THE INVENTION

The present invention relates to a cleaning appliance. The cleaning appliance is preferably a handheld cleaning appliance, and is preferably a surface treating appliance. In preferred embodiments of the invention, the appliance is a dental cleaning appliance. In a preferred embodiment, the appliance is an electric toothbrush having a fluid delivery system for delivering a fluid to the teeth of the user. This fluid may be toothpaste, or a fluid for improved interproximal cleaning. Alternatively, the appliance may not include any bristles or other elements for brushing teeth, and may be in the form of a dedicated interproximal cleaning appliance. The invention also relates to a cleaning tool for use with a dental cleaning appliance.

BACKGROUND OF THE INVENTION

Electric toothbrushes generally comprise a cleaning tool which is connected to a handle. The cleaning tool comprises a stem and a brush head bearing bristles for brushing teeth. The brush head comprises a static section which is connected to the stem, and at least one moveable section which is moveable relative to the static section, for example with one of a reciprocating, oscillating, vibrating, pivoting or rotating motion, to impart a brushing movement to bristles mounted thereon. The stem houses a drive shaft which couples with a transmission unit within the handle. The transmission unit is in turn connected to a motor, which is driven by a battery housed within the handle. The drive shaft and the transmission unit convert rotary or vibratory motion of the motor into the desired movement of the moveable section of the brush head relative to the static section of the brush head.

It is known to incorporate into an electric toothbrush an assembly for generating a jet of fluid for interproximal cleaning. For example, U.S. Pat. No. 8,522,384 describes an electric toothbrush in which the handle of the toothbrush defines a fluid chamber for storing a liquid such as water, and a slidable cover for enabling the fluid chamber to be accessed for replenishment by a user. A fluid path connects the fluid chamber to a nozzle located on a static portion of the brush head. A pump located within the fluid path is actuated upon user operation of an actuator on the handle to pump fluid from the fluid chamber to the nozzle for release under pressure from the nozzle.

SUMMARY OF THE INVENTION

In a first aspect, the present invention provides a dental cleaning appliance comprising a nozzle for delivering a burst of working fluid to the teeth of a user; and a fluid conduit for conveying working fluid to the nozzle; wherein the nozzle comprises a fluid chamber extending about a longitudinal axis and a channel for conveying working fluid from the fluid chamber to a fluid outlet from the nozzle, the fluid chamber comprising a fluid inlet for conveying working fluid into the fluid chamber at an angle to the longitudinal axis.

Each burst of working fluid preferably has a volume which is preferably less than 1 ml, more preferably less than 0.5 ml. In a preferred embodiment, the volume of the burst of working fluid delivered to the teeth of a user is in the range from 0.1 to 0.4 ml, and is preferably around 0.25 ml.

Within the fluid chamber, the nozzle thus generates angular momentum of the working fluid about the longitudinal axis of the fluid chamber. The working fluid is conveyed to the fluid outlet of the nozzle by a channel extending between the fluid chamber and the fluid outlet. The burst of working fluid is projected outwardly from the fluid outlet and breaks up to form a spray. The spray of working fluid expands out of the fluid outlet of the nozzle and is generally conical in nature after the fluid outlet. The working fluid ejected from the nozzle is encouraged to break up and form a divergent spray with droplets because sufficient angular momentum and flow disruption has been introduced into the flow within the fluid chamber. This action, together with sufficient momentum in the general direction of the flow, enables matter located within an interproximal gap of a user's teeth to be dislodged by the working fluid.

We have found that delivering such a burst of working fluid as a spray of droplets, that is formed from a nozzle having an angled inlet as opposed to an axial inlet, delivered to an interproximal gap is more effective at dislodging matter therein. This can enable a user to reduce the number of bursts of working fluid which are required to dislodge matter therein, reducing the time required to perform an entire teeth cleaning operation and reducing the risk that a fluid reservoir for supplying working fluid to the nozzle will become exhausted prior to the completion of the teeth cleaning operation.

The fluid inlet is preferably arranged to convey the fluid into the fluid chamber along a path which is located in a plane which is substantially orthogonal to the longitudinal axis. The fluid inlet is preferably arranged to convey the fluid into the fluid chamber along a path which is spaced from, or offset from, the longitudinal axis. The fluid inlet is preferably in the form of a tangential inlet for conveying the fluid substantially tangentially into the fluid chamber. The fluid chamber preferably has, in a plane which is orthogonal to the longitudinal axis, a cross-section which is substantially circular in shape. The fluid chamber may be cylindrical, spheroidal or spherical in shape. However, the fluid chamber may adopt any other shape which can generate angular momentum in the burst of working fluid received by the fluid chamber. For example, the cross-section of the fluid chamber may be oval, elliptical, or polygonal.

The diameter of the fluid chamber is preferably in the range from 2 to 6.5 mm and in a preferred embodiment is around 4 mm.

An outlet port from the fluid chamber is preferably located on the longitudinal axis of the fluid chamber, and thus orthogonal to the inlet of the fluid chamber. The fluid outlet of the nozzle is preferably in axial alignment with the outlet port of the fluid chamber. The channel extending between the outlet port of the fluid chamber and the fluid outlet of the nozzle is preferably cylindrical in shape, and preferably has a diameter which is smaller than the diameter of the fluid chamber.

The diameter of the channel is preferably in the range from 1.5 to 3 mm, and in a preferred embodiment is around 2 mm. The transition between the fluid chamber and the channel may be tapered and/or stepped; in a preferred embodiment the outlet port is frustoconical in shape, tapering inwardly in a direction extending from the fluid chamber to the channel.

The fluid outlet of the nozzle preferably has a diameter which is smaller than the diameter of the channel. The fluid outlet preferably has a diameter in the range from 0.5 to 1.5 mm, and in a preferred embodiment is around 0.7 mm. The transition between the channel and the fluid outlet may be tapered and/or stepped; in a preferred embodiment the transition is frustoconical in shape, tapering inwardly in a direction extending from the channel to the fluid outlet. The longitudinal axis of the fluid chamber preferably passes through the fluid outlet of the nozzle, and so the longitudinal axis of the fluid chamber may be referred to as a nozzle axis on which the fluid chamber and the channel are centered.

The nozzle and the fluid conduit preferably form part of a fluid delivery system. The fluid delivery system is preferably configured to deliver working fluid to the inlet of the fluid chamber at a static pressure in the range from 3 to 10 bar. The fluid delivery system preferably comprises a pump and a control circuit for actuating the pump to eject a burst of working fluid towards the nozzle. As mentioned above, the volume of each burst of working fluid which is generated by the fluid delivery system is preferably less than 1 ml, more preferably less than 0.5 ml. In a preferred embodiment, the volume of the burst of working fluid generated by the fluid delivery system is in the range from 0.1 to 0.4 ml, and is preferably around 0.25 ml.

As the nozzle is moved between adjacent teeth of the user, the user may depress a button of a user interface provided on a handle of the appliance to actuate the pump to cause a burst of working fluid to be ejected from the nozzle. Alternatively, the appliance may be configured to actuate the delivery of working fluid to the teeth of the user automatically depending on the magnitude of an output from a sensor for detecting that the nozzle is located within an interproximal gap. For example, the sensor may be in the form of a light detector, such a camera or a light sensor, for receiving light, such a visible light or infrared light, reflected from a user's teeth. As another alternative, the appliance may be configured to actuate the delivery of working fluid to the teeth of the user automatically at a fixed frequency, for example between 0.5 and 5 Hz. The pump is preferably a positive displacement pump, such as a piston pump or a diaphragm pump. A hydraulic accumulator may be provided between the pump and the nozzle for storing working fluid at a pressure in the range from 3 to 10 bar. In this case, the fluid delivery system may comprises a valve, such as a solenoid valve, located downstream from the accumulator, and the control circuit may be configured to change the position of the valve from a closed position to an open position to release working fluid from the accumulator.

The nozzle may be moveable relative to a handle of the appliance. The nozzle is preferably moveable relative to the handle in a direction which extends generally parallel to or generally along the nozzle axis. The nozzle is preferably biased for movement relative to the handle in such a direction that the nozzle is urged against a user's teeth during use of the appliance. The fluid conduit is preferably moveable with the nozzle.

The nozzle may be connected to an arm, and that arm may be biased for movement relative to the handle in a direction which urges the nozzle against a user's teeth during use of the appliance. For example, the arm may be urged to move in that direction by a resilient member which engages the arm. Alternatively, the arm may be deformed elastically in such a manner that relaxation of the arm urges the nozzle against the user's teeth.

In a preferred embodiment, the fluid conduit is biased for movement relative to the handle in a direction which urges the nozzle against a user's teeth during use of the appliance. This fluid conduit may thus serve to bias the nozzle for movement relative to the handle in such a direction that the nozzle is urged against a user's teeth during use of the appliance. The fluid conduit may be moveable relative to the handle in one of a number of different ways. For example, the fluid conduit may be slidable, pivotable, rotatable or otherwise translatable relative to the handle. Alternatively, the fluid conduit may be extendable or expandable.

In a preferred example, the nozzle is moveable relative to the handle about an axis. The nozzle is preferably pivotable about the axis. This axis is preferably substantially orthogonal to the longitudinal axis of the handle. The axis is preferably angled to the nozzle axis, and is more preferably substantially orthogonal to the nozzle axis.

The fluid conduit preferably has a rigidity which is such that the fluid conduit does not deform, bend or kink as the fluid conduit moves with the nozzle relative to the handle. The fluid conduit is preferably formed from one of metallic and plastics material.

The nozzle is preferably biased for movement relative to the handle by a resilient member. The resilient member may engage a component to which the nozzle is connected. For example, the nozzle may be connected to a support for supporting the nozzle, and the support may be arranged to be moveable relative to the handle. The support may be biased for movement relative to the handle. As the support moves relative to the handle, the nozzle and the fluid conduit may move relative to the handle, preferably about an axis. Alternatively, the resilient member may engage the fluid conduit. The resilient member preferably exerts a force on the fluid conduit, or the support, which is of a sufficient magnitude to allow the nozzle to move, against the biasing force of the resilient member, as it is pressed against the user's teeth, and without exerting an excessive force on the teeth which is uncomfortable for the user.

In a preferred embodiment, the resilient member forms a part of the fluid delivery system, and is preferably in the form of a resilient section of the fluid conduit which is connected to the nozzle. That resilient section of the fluid conduit may be twisted, bent, compressed or otherwise deformed so as to exert a force on the nozzle which urges it to move relative to the handle against a user's teeth during use of the appliance.

Thus, the fluid delivery system may comprise a nozzle from which the burst of working fluid is delivered to the teeth of a user, and a fluid conduit having a relatively rigid section which is pivotable about an axis, and a relatively flexible, resilient section for urging the nozzle, and the relatively rigid section of the fluid conduit, to pivot about the axis in a direction which urges the nozzle against a user's teeth during use of the appliance. Alternatively, the sections of the fluid conduit may be provided by discrete connected components.

The appliance preferably comprises a cleaning tool which is detachably connected to the handle. The fluid delivery system may thus comprise a cleaning tool conduit system and a handle conduit system. The handle conduit system preferably comprises a fluid inlet port for receiving working fluid from a fluid outlet port of a fluid reservoir. The handle conduit system comprises a plurality of conduits for conveying working fluid between the fluid inlet port, the pump and a fluid outlet port of the handle. The cleaning tool conduit system preferably comprises a fluid inlet port for receiving a burst of working fluid from the handle fluid outlet port, the nozzle, and the fluid conduit.

The appliance preferably comprises a head, and a stem extending between the head and the handle. The nozzle preferably protrudes outwardly from, and is moveable relative to, the head. The nozzle is preferably biased for movement relative to the head in a direction which extends away from the head. The nozzle is preferably moveable between a distal position and a proximal position relative to the head. The nozzle is preferably biased for movement towards the distal position.

To facilitate the movement of the nozzle along the teeth of user during use of the appliance, the head preferably comprises means for engaging the teeth of the user, with the nozzle being moveable relative to the engaging means as it moves between its distal and proximal positions. For user comfort, the engaging means may be formed from resilient or elastomeric material. The engaging means may have a substantially flat upper surface, a curved upper surface, or a stepped upper surface. For example, the engaging means may have a concave upper surface. When the nozzle is in its distal position relative to the head, the tip of the nozzle preferably protrudes outwardly beyond at least some of the engaging means so that, when the nozzle is pressed against a user's teeth, the nozzle moves away from the distal position and towards the proximal position.

The appliance may be in the form of a dedicated interproximal cleaning appliance for cleaning between the gaps in the user's teeth. For such an appliance, the engaging means may comprise a single resilient member which surrounds the nozzle. Alternatively, the engaging means may comprise a plurality of resilient members arranged adjacent to the nozzle. The resilient members may be located on opposite sides or ends of the head, or arranged about the nozzle. For example, the resilient members may be arranged circumferentially about the nozzle. The resilient member(s) may be formed from elastomeric material.

Alternatively, the appliance may be in the form of a toothbrush which has the additional function of improved interproximal cleaning through the emission of a burst of working fluid into the interproximal gap. Where the appliance is in the form of a toothbrush, the engaging means preferably comprises a plurality of bristles. The bristles are preferably arranged around the nozzle, and may be arranged circumferentially about the nozzle.

The plurality of bristles may be attached to a static section of the head, which section is not moveable relative to the handle. Alternatively, or additionally, a plurality of bristles may be attached to a moveable section of the head, which section is moveable relative to the handle. In a preferred embodiment, the appliance comprises a brush unit comprising a bristle carrier and a plurality of bristles mounted on the bristle carrier, with the bristle carrier being moveable relative to the handle. The nozzle is preferably biased for movement relative to the brush unit in a direction extending away from the brush unit.

In addition to the movement of the nozzle relative to the brush unit, the brush unit is preferably moveable relative to the nozzle. The movement of the brush unit relative to the nozzle, to enable the ends of the bristles to be swept over the surfaces of the teeth of the user, may thus be independent from the movement of the nozzle relative to the handle. The bristle carrier may translate, rotate, pivot or vibrate relative to the nozzle.

The working fluid is preferably a liquid working fluid, and is preferably water. The appliance preferably comprises a fluid reservoir for storing working fluid, and from which working fluid is supplied to the fluid delivery system. The handle of the appliance may comprise the fluid reservoir. For example, the fluid reservoir may be fully contained within a body of the handle. Alternatively, an external wall of the handle may at least partially delimit the fluid reservoir. At least part of that external wall may be transparent to allow a user to see the volume of working fluid contained within the fluid reservoir. Alternatively, the fluid reservoir may be housed within the stem. As above, an external wall of the stem may at least partially delimit the fluid reservoir, and at least part of that external wall may be transparent to allow a user to see the volume of working fluid contained within the fluid reservoir. As an alternative to housing the fluid reservoir within the stem, the fluid reservoir may be connected to the stem so as to be located externally of the stem. This can allow the fluid reservoir to be detached from the stem for replenishment or replacement as required. Alternatively, the fluid reservoir may be partially delimited by an external wall which is connected to the stem. Again, at least part of that external wall may be transparent to allow a user to see the volume of working fluid contained within the fluid reservoir. To maximize the capacity of the fluid reservoir and to provide for a relatively even weight distribution about the longitudinal axis of the appliance, the fluid reservoir preferably extends about, or surrounds, the stem.

As mentioned above, the cleaning tool is preferably detachably connected to the handle. This can allow a handle to be provided with a set of similar cleaning tools, each with a respective different identifier for use by a different user. This can also allow a handle to be provided with a set of dissimilar cleaning tools. For example, the set of cleaning tools may be selected from two or more of a first type of cleaning tool with a nozzle and a moveable brush unit, a second type of cleaning tool with a nozzle and a static brush unit, a third type of cleaning tool with a nozzle and no bristles, and a fourth type of cleaning tool with a moveable brush unit and no nozzle. A number of respective different cleaning tools of the same type may also be provided, for example, of the first type of cleaning tool, with bristles having a respective different stiffness, or with nozzles having respective different fluid outlet sizes.

The appliance is preferably a handheld appliance which includes all of the aforementioned components of the appliance.

The cleaning tools may be sold as stand-alone items, for example as spare parts or as alternative cleaning tools for use with an existing handle.

In a second aspect the present invention provides a cleaning tool for a dental cleaning appliance comprising a handle to which the cleaning tool is detachably connectable, the cleaning tool comprising a stem; and a cleaning tool conduit system comprising a nozzle for delivering a burst of working fluid to the teeth of a user, and a fluid conduit for conveying working fluid to the nozzle, wherein the nozzle comprises a fluid chamber extending about a longitudinal axis and a channel for conveying working fluid from the fluid chamber to a fluid outlet from the nozzle, the fluid chamber comprising a fluid inlet for conveying working fluid into the fluid chamber at an angle to the longitudinal axis.

Features described above in connection with the first aspect of the invention are equally applicable to the second aspect of the invention, and vice versa.

BRIEF DESCRIPTION OF THE DRAWINGS

Preferred features of the present invention will now be described by way of example only with reference to the accompanying drawings, in which.

DETAILED DESCRIPTION OF THE INVENTION

Figure 1A:
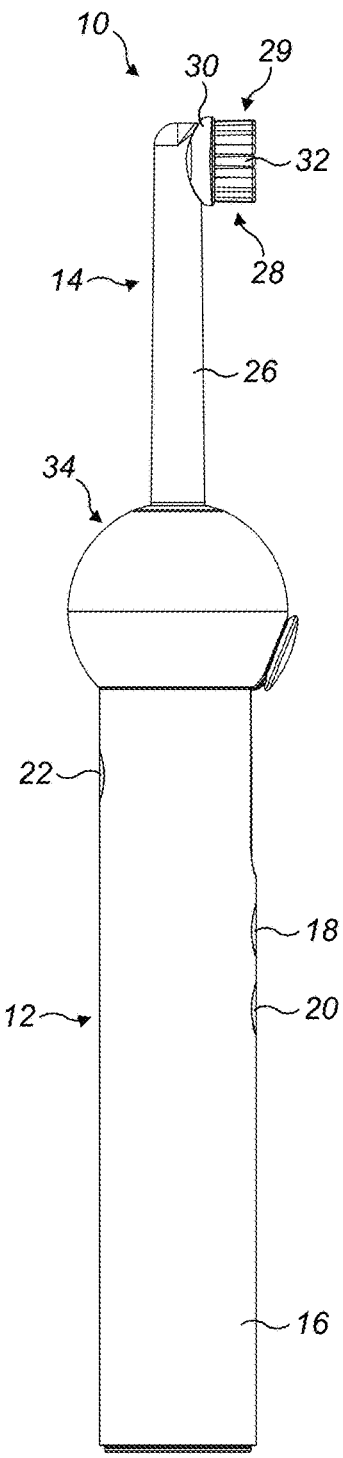
FIG. 1(a) is a right side view of a dental cleaning appliance.
Figure 1B:
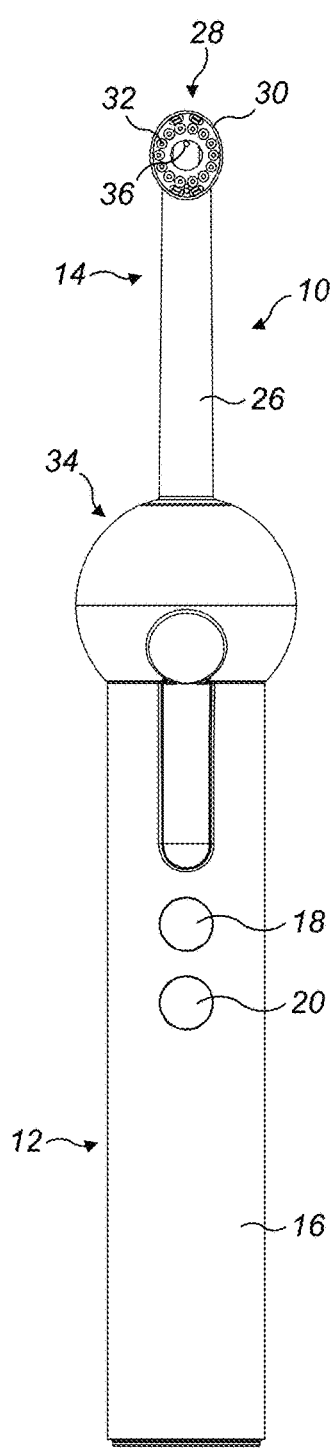
FIG. 1(b) is a front view of the appliance.
Figure 1C:
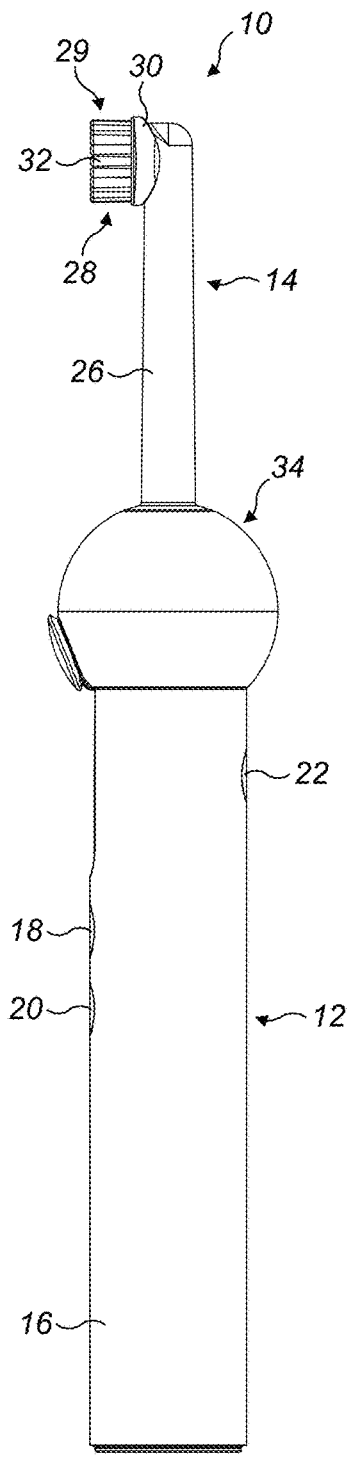
FIG. 1(c) is a left side view of the appliance.

FIGS. 1(a) to 1(c) illustrate external views of an embodiment of a dental cleaning appliance 10. In this embodiment, the appliance is in the form of a handheld appliance, which is in the form of an electric toothbrush having an integrated assembly for dispensing a working fluid for improved interproximal cleaning.

The appliance 10 comprises a handle 12 and a cleaning tool 14. The handle 12 comprises an external body 16 which is gripped by a user during use of the appliance 10. The body 16 is preferably formed from plastics material, and is preferably generally cylindrical in shape. The handle 12 comprises a plurality of user operable buttons 18, 20, 22 which are located within respective apertures formed in the body 16 so as to be accessible to the user. The handle 12 may comprise a display which is positioned so as to be visible to a user during use of the appliance.

The cleaning tool 14 comprises a stem 26 and a head 28. The stem 26 is elongate in shape, which serves to space the head 28 from the handle 12 to facilitate user operability of the appliance 10. In this embodiment, the head 28 of the cleaning tool 14 comprises a brush unit 29, which comprises a bristle carrier 30 and a plurality of bristles 32 mounted on the bristle carrier 30. However, in other embodiments the cleaning tool 14 may be provided without a brush unit 29 so that the appliance is in the form of a dedicated interproximal cleaning appliance for cleaning between the gaps in the user's teeth.

The cleaning tool 14 also comprises a fluid reservoir 34 for storing a working fluid, and a nozzle 36 for delivering one or more bursts of working fluid to the teeth of the user during use of the appliance 10. The fluid reservoir 34 is connected to the stem 26. The fluid reservoir 34 extends at least partially around the stem 26. In this embodiment which includes a brush unit 29, the brush unit 29 extends at least partially around the nozzle 36.

Figure 2:
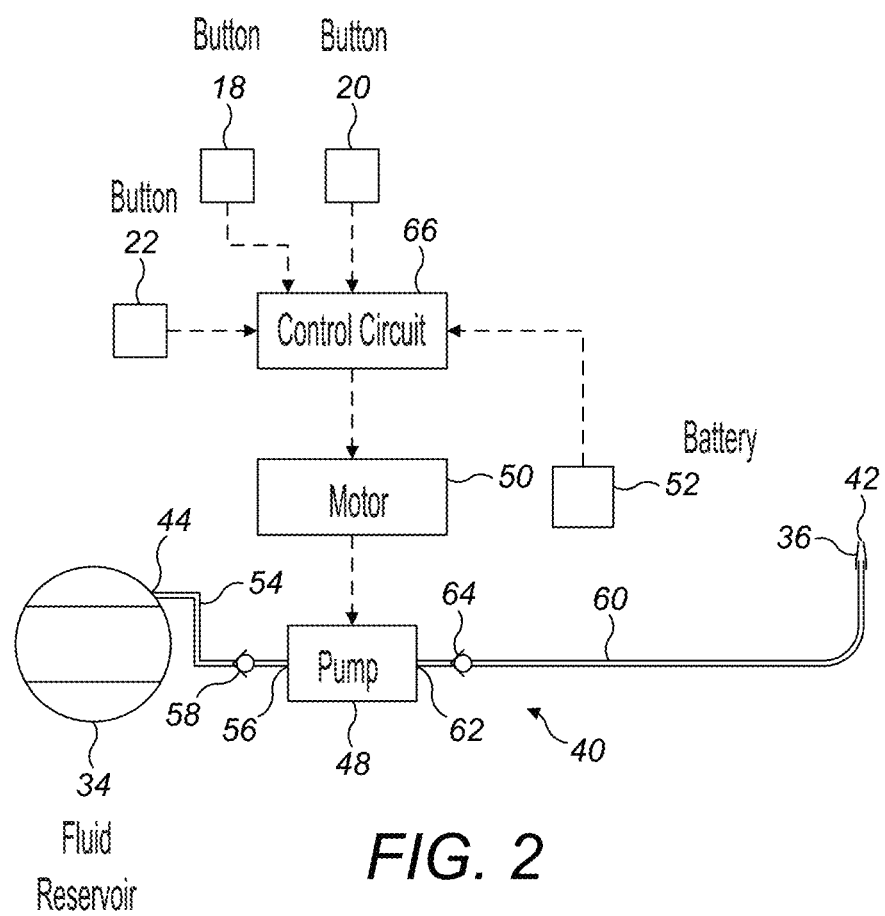
FIG. 2 illustrates schematically components of a fluid delivery system for delivering a burst of a working fluid to the teeth of a user.

The nozzle 36 forms part of a fluid delivery system 40 for receiving working fluid from the fluid reservoir 34 and for delivering bursts of working fluid to the teeth of a user during use of the appliance 10. Each burst of working fluid preferably has a volume which is less than 1 ml, more preferably less than 0.5 ml, and in this example is around 0.25 ml. The tip of the nozzle 36 comprises a fluid outlet 42 through which a burst of working fluid is delivered to the teeth of the user. The fluid delivery system 40 is illustrated schematically in FIG. 2. In overview, the fluid delivery system 40 comprises a fluid inlet 44 for receiving working fluid from the fluid reservoir 34. In this embodiment, the working fluid is a liquid working fluid, which is preferably water. The fluid delivery system 40 comprises a pump assembly for drawing working fluid from the fluid reservoir 34 through the fluid inlet 44, and for delivering a burst of working fluid to the nozzle 36. The pump assembly is located within the handle 12, and comprises a positive displacement pump 48 and a drive for driving the pump 48. The drive preferably comprises a motor 50. A battery 52 for supplying power to the motor 50 is also located in the handle 12. The battery 52 is preferably a rechargeable battery.

A first conduit 54 connects the fluid inlet 44 of the fluid delivery system 40 to a fluid inlet 56 of the pump 48. A first one-way valve 58 is located between the fluid inlet 44 and the pump 48 to prevent water from returning to the fluid reservoir 34 from the pump 48. A second conduit 60 connects a fluid outlet 62 of the pump 48 to the nozzle 36. A second one-way valve 64 is located between the pump 48 and the nozzle 36 to prevent water from returning to the pump 48. A control circuit 66 controls the actuation of the motor 50, and so the motor 50 and the control circuit 66 provide a drive for driving the pump 48. The battery 52 supplies power to the control circuit 66. The control circuit 66 includes a motor controller, which supplies power to the motor 50.

In this embodiment, the control circuit 66 receives signals generated when the user depresses the buttons 18, 20, 22 located on the handle 12 of the appliance 10. Alternatively, or additionally, the control circuit 66 may receive signals which are generated by a sensor located within the appliance, or which are received from a remote device, such as a display or a personal device. For brevity, in the following description the control circuit 66 receives signals which are generated when the user operates one of the buttons 18, 20, 22.

Figure 3:
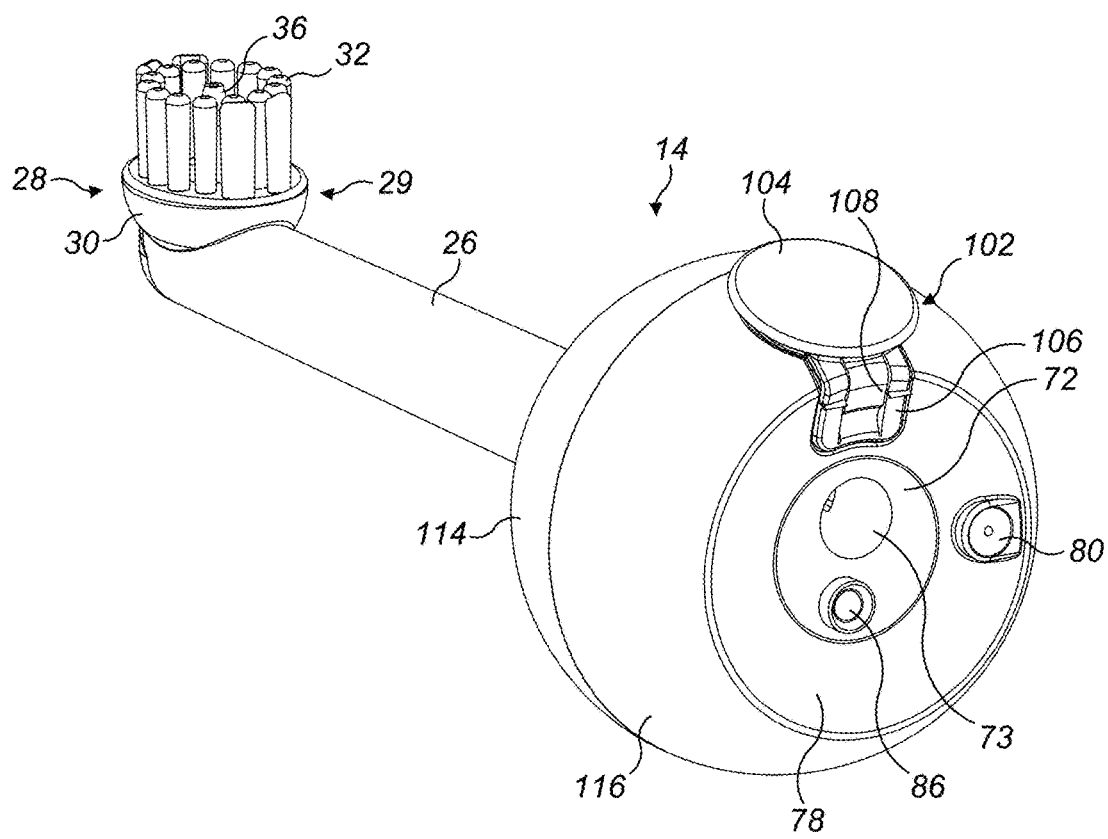
FIG. 3 is a right side perspective view, from above, of a cleaning tool of the appliance.
Figure 4:
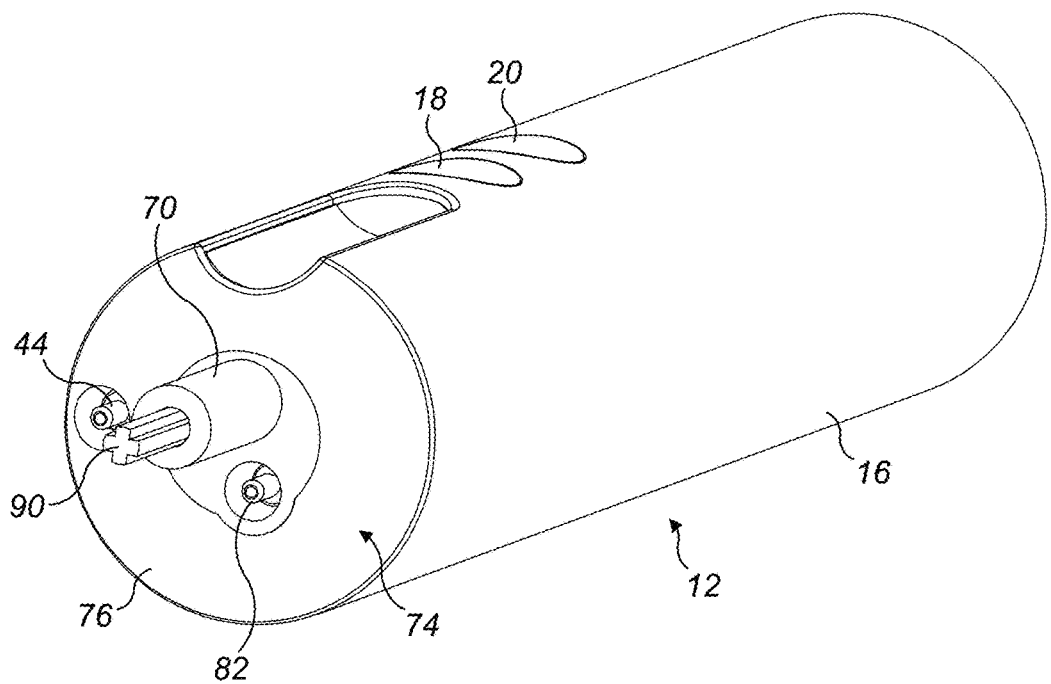
FIG. 4 is a right side perspective view, from above, of a handle of the appliance.
Figure 5:
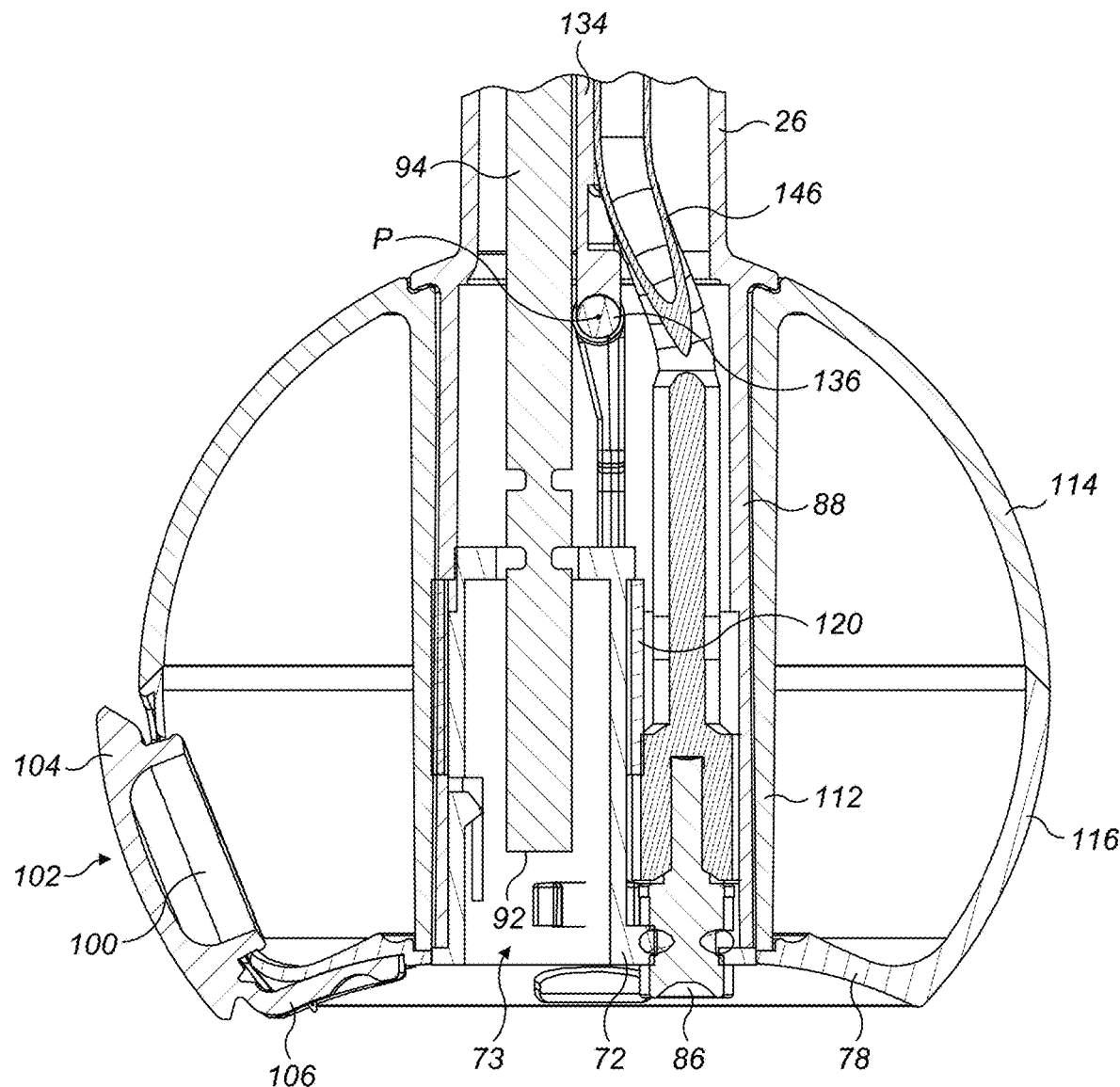
FIG. 5 is a side sectional view of a lower part of the cleaning tool.

The cleaning tool 14 is detachably connected to the handle 12. With reference to FIGS. 3 to 5, the handle 12 comprises a male connector, preferably in the form of a spigot 70, which is received by a complementary female connector, preferably in the form of a recessed connector 72, of the cleaning tool 14. The recessed connector 72 defines a generally cylindrical recess 73 for receiving the spigot 70. The spigot 70 preferably protrudes outwardly from an end surface 74 of the body 16, and preferably in a direction which is parallel to a longitudinal axis of the handle 12. The end surface 74 defines an annular seat 76 for receiving an annular bottom wall 78 of the fluid reservoir 34 when the cleaning tool 14 is mounted on the handle 12. The annular seat 76 comprises the fluid inlet 44 of the fluid delivery system 40. The fluid inlet 44 receives fluid from a reservoir fluid outlet port 80 of the fluid reservoir 34 when the cleaning tool 14 is mounted on the handle 12.

Figure 6:
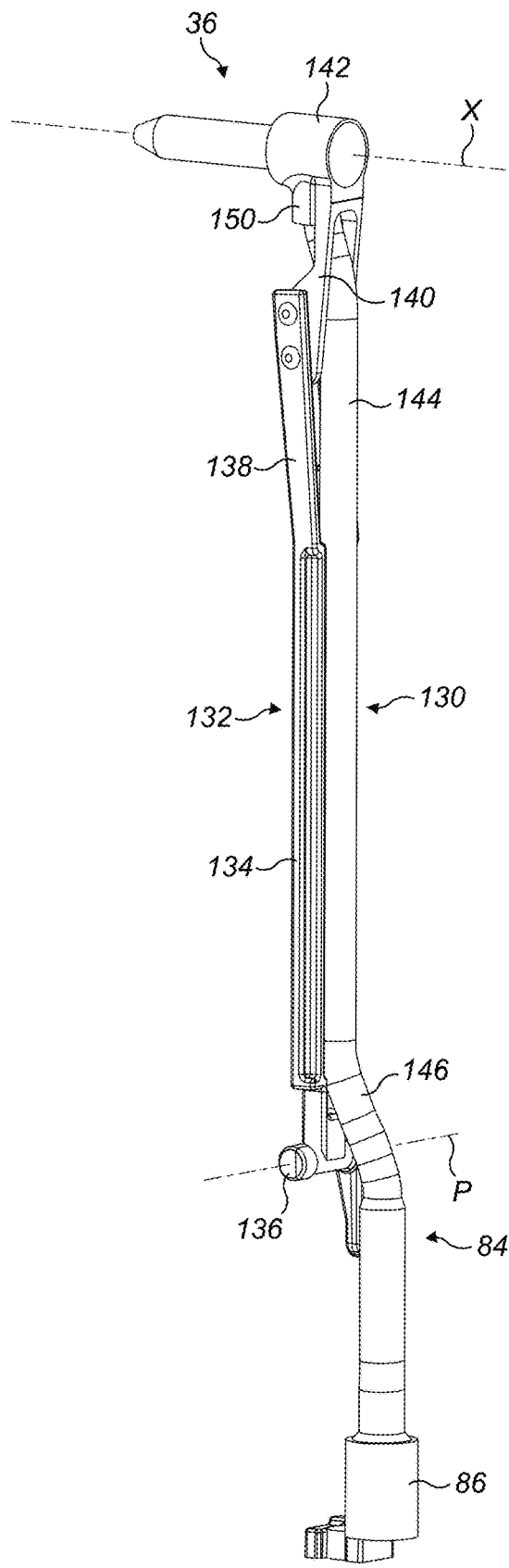
FIG. 6 is a perspective view of a conduit system of the cleaning tool.

The second conduit 60, which connects the fluid outlet 62 of the pump 48 to the nozzle 36, comprises a handle conduit section located within the handle 12, and a cleaning tool conduit section located within the cleaning tool 14. The handle conduit section extends from the fluid outlet 62 of the pump 48 to a handle fluid outlet port 82 located adjacent to the spigot 70. The cleaning tool conduit section 84, illustrated in FIG. 6, comprises a cleaning tool fluid inlet port 86 for receiving fluid from the handle fluid outlet port 82 when the cleaning tool 14 is connected to the handle 12. The cleaning tool fluid inlet port 86 protrudes from the base of the recessed connector 72. The recessed connector 72 is housed within, and connected to, a relatively wide base section 88 of the stem 26.

As mentioned above, the cleaning tool 14 includes a bristle carrier 30 which is moveable relative to the stem 26. The appliance 10 comprises a drive mechanism for driving the movement of the bristle carrier 30 relative to the stem 26. The drive mechanism comprises a transmission unit connected to the bristle carrier 30, and a drive unit for driving the transmission unit to move the bristle carrier 30 relative to the stem 26.

The handle 12 comprises the drive unit of the drive mechanism. The drive unit comprises a motor, preferably in the form of a dc motor, which is actuated by the control circuit 66 in response to the user depression of one or more of the buttons of the handle 12. The motor of the drive unit is connected via a gear train to a rotatable drive unit coupling member 90 which protrudes outwardly from the spigot 70, and which rotates relative to the body 16 upon actuation of the motor of the drive unit.

The cleaning tool 14 comprises the transmission unit of the drive mechanism. The transmission unit comprises a transmission unit coupling member 92 which couples with, and preferably receives, the drive unit coupling member 90 when the cleaning tool 14 is connected to the handle 12. The transmission unit coupling member 92 is connected to, and is preferably integral with, one end of a connecting rod 94 housed within the stem 26. The other end of the connecting rod 94 is connected to the side surface of the bristle carrier 30 so that periodic rotation of the connecting rod 94 about a 15° angle results in a 15° sweeping movement of the bristle carrier 30 relative to the stem 26.

The fluid reservoir 34 is mounted on, and extends at least partially around, the stem 26 of the cleaning tool 14. In this embodiment, the fluid reservoir 34 is annular in shape, and so surrounds the stem 26. The fluid reservoir 34 is preferably located at or towards the end of the stem 26 which is remote from the head 28, and so in this embodiment extends around the base section 88 of the stem 26. The fluid reservoir 34 preferably has a capacity in the range from 5 to 50 ml, and in this embodiment has a capacity of 25 ml.

The fluid reservoir 34 is filled through a reservoir fluid inlet port 100 formed in the external wall of the fluid reservoir 34. The fluid inlet port 100 is preferably formed in an annular external side wall of the fluid reservoir 34. The reservoir fluid inlet port 100 is sealed by a closure member 102. The closure member 102 is moveable relative to the fluid reservoir 34 between a closed position, as shown in FIG. 3, in which the closure member 102 inhibits the leakage of working fluid from the reservoir fluid inlet port 100, and an open position. In this embodiment, the closure member 102 is pivotably connected to the fluid reservoir 34. The closure member 102 is locatable within, and forms a fluid-tight seal against, the reservoir fluid inlet port 100. The closure member 102 comprises a head 104 which may be gripped by the user to move the closure member 102 from the closed position to the open position, and which may be pushed by the user towards the reservoir fluid inlet port 100 to return the closure member 102 to the closed position.

The closure member 102 is connected to the fluid reservoir 34 by a pair of arms 106. One end of each arm 106 is connected to the closure member 102, and the other end of each arm 106 is connected to the fluid reservoir 34. In this embodiment, the arms 106 are integral with the closure member 102, with a portion of each arm 106 which is remote from the closure member 102 being connected to the bottom wall 78 of the fluid reservoir 34, for example using an adhesive or by welding. Each 106 comprises a hinge 108, which may be formed from a part of the arm 106 which has a locally reduced thickness, to enable the part of the arm 106 which is connected to the closure member 102 to pivot relative to the other part of the arm 106 which is connected to the fluid reservoir 34.

To fill the fluid reservoir 34, the user detaches the cleaning tool 14 from the handle 12, grips the head 104 of the closure member 102 between finger and thumb and pulls it out from the reservoir fluid inlet port 100. The fluid reservoir 34 may then be filled by the user, for example by locating the reservoir fluid inlet port 100 beneath a running tap. Once the fluid reservoir 34 has been filled, the user pushes the head 104 of the closure member 102 back into the reservoir fluid inlet port 100, and reconnects the cleaning tool 14 to the handle 12. The pivoting connection between the closure member 102 and the bottom wall 78 of the fluid reservoir 34 inhibits accidental loss of the closure member 102 while the reservoir fluid inlet port 100 is exposed, and enables the joint between the closure member 102 and the fluid reservoir 34 to be located between the handle 12 and the fluid reservoir 34 when the cleaning tool 14 is mounted on the handle 12. As shown in FIG. 3, the lower parts of the arms 106 of the closure member 102 are located within a recessed section of the bottom wall 78 of the fluid reservoir 34 when the closure member 102 is in its closed position so that the bottom surfaces of the lower parts of the arms 106 are substantially flush with the bottom wall 78 of the fluid reservoir 34.

At least part of the external wall of the fluid reservoir 34 is preferably transparent to allow a user to observe the contents of the fluid reservoir 34, and so assess whether the fluid reservoir 34 requires replenishment prior to the desired use of the appliance 10. The external wall preferably has a shape which is symmetrical about the longitudinal axis of the cleaning tool 14. The external wall preferably has a curved shape, more preferably a convex curved shape, but alternatively the external wall may have a polygonal or faceted shape. In this embodiment, the external wall has a spherical curvature. As described below, the fluid reservoir 34 is mounted on the relatively wide base section 88 of the stem 26, and so the external wall has opposed circular apertures which are centred on the longitudinal axis of the cleaning tool 14 to allow the base section 88 of the stem 26 to pass therethrough.

The fluid reservoir 34 further comprises an inner wall 112 which is connected to the external wall, and which with the external wall defines the capacity of the fluid reservoir 34. The inner wall 112 is tubular in shape. The ends of the inner wall 112 are preferably circular in shape, and are connected to the external wall so as to form a fluid-tight seal between the external wall and the inner wall 112. In this embodiment, the fluid reservoir 34 is formed from two housing parts. A first housing part 114 comprises an upper section of the external wall and the inner wall 112, and so the upper end of the inner wall 112 is integral with an upper section of the external wall. A second housing part 116 comprises a lower section of the external wall and the bottom wall 78 of the fluid reservoir 34.

To mount the fluid reservoir 34 on the stem 26, the circular aperture formed in the first housing part 114 of the fluid reservoir 34 is aligned with the free end of the base section 88 of the stem 26, and the fluid reservoir 34 is pushed on to the stem 26. The internal surface of the inner wall 112 of the fluid reservoir 34 bears against the base section 88 of the stem 26 so that frictional forces therebetween prevent the fluid reservoir 34 from falling from the stem 26. To mount the cleaning tool 14 on the handle 12, the spigot 70 of the handle 12 is aligned with the recess 73 formed in the connector 72 of the cleaning tool 14, and the handle fluid outlet port 82 located adjacent to the spigot 70 is aligned with the cleaning tool fluid inlet port 86 of the cleaning tool 14. The cleaning tool 14 is then pushed on to the spigot 70 so that the handle fluid outlet port 82 connects to the cleaning tool fluid inlet port 86, and so that the fluid reservoir 34 engages the annular seat 76 to connect the reservoir fluid outlet port 80 to the fluid inlet 44 of the fluid delivery system 40. The internal surface of the connector 72 of the stem 26 bears against the external surface of the spigot 70 so that frictional forces therebetween retain the stem 26 on the handle 12. The connector 72 is preferably formed from resilient plastics material which flexes as the connector 72 is pushed on to the spigot 70 to increase the frictional forces therebetween. A spring clip 120 may be provided at least partially about the connector 72 for urging the internal surface of the connector 72 against the spigot 70.

Turning to FIGS. 6 to 9, the cleaning tool conduit section 84 comprises a fluid conduit 130 for conveying fluid from the cleaning tool fluid inlet port 86 to the nozzle 36. The nozzle 36 is mounted on a support 132 which supports the nozzle 36 for movement relative to the handle 12 and to the stem 26 of the cleaning tool 14. The support 132 comprises an elongate body 134 which is connected to the stem 26 for pivoting movement about a pivot axis P. For example, the support 132 may comprise a cylindrical boss 136 which is retained between a pair of spaced recesses formed in the base 88 of the stem 26. Pivot axis P passes through the stem 26, and is substantially orthogonal to the longitudinal axis of the stem 26. The support 132 is generally Y-shaped, having a pair of arms 138 which extend upwardly from the body 134 and which are each connected to a respective leg 140 of the body 142 of the nozzle 36.

Figure 7:
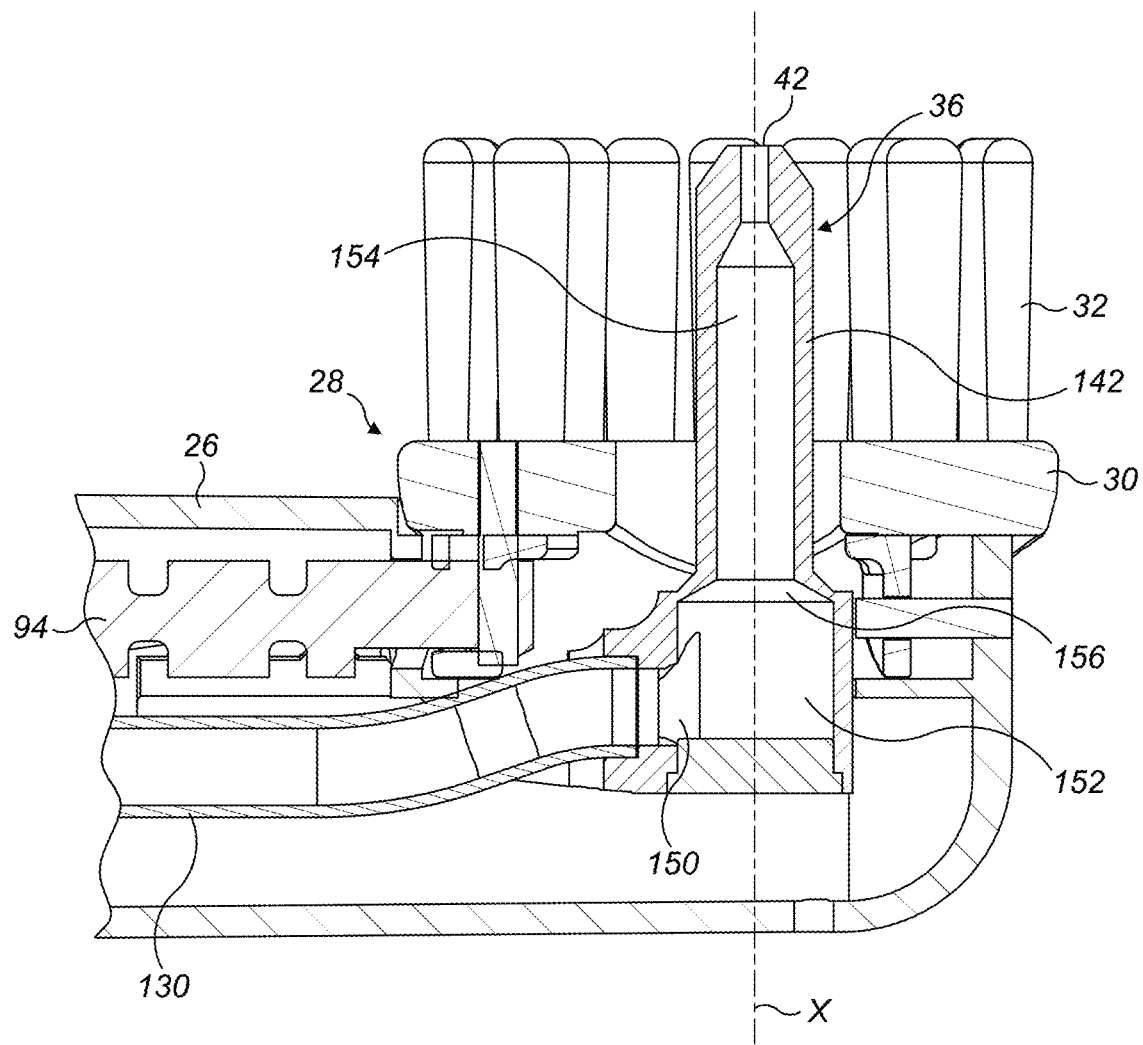
FIG. 7 is a side sectional view of an upper part of the cleaning tool.

The nozzle 36 is moveable relative to the handle 12 between a first, or distal, position, and a second, or proximal, position. In the distal position, the tip of the nozzle 36 protrudes outwardly beyond the ends of the bristles 32, whereas in the proximal position, the tip of the nozzle 36 is retracted relative to the ends of the bristles 32. In this embodiment, the nozzle 36 is biased for movement towards the distal position. The fluid conduit 130 comprises a relatively rigid section 144 which is connected to the nozzle 36, and a relatively flexible section 146 located between the relatively rigid section 144 and the cleaning tool fluid inlet port 86, and which is housed within the stem 26 so as to be in an elastically deformed configuration. With reference to FIG. 7, the internal force created within the relatively flexible section 146 of the fluid conduit 130 acts in such a direction to urge the relatively rigid section 144 of the fluid conduit 130 towards the connecting rod 94. Through the connections made between the fluid conduit 130, the nozzle 36 and the support 132, this internal force causes the nozzle 36 to pivot about the pivot axis P in such a direction that urges the nozzle 36 towards the distal position relative to the brush unit 29.

Figure 9:
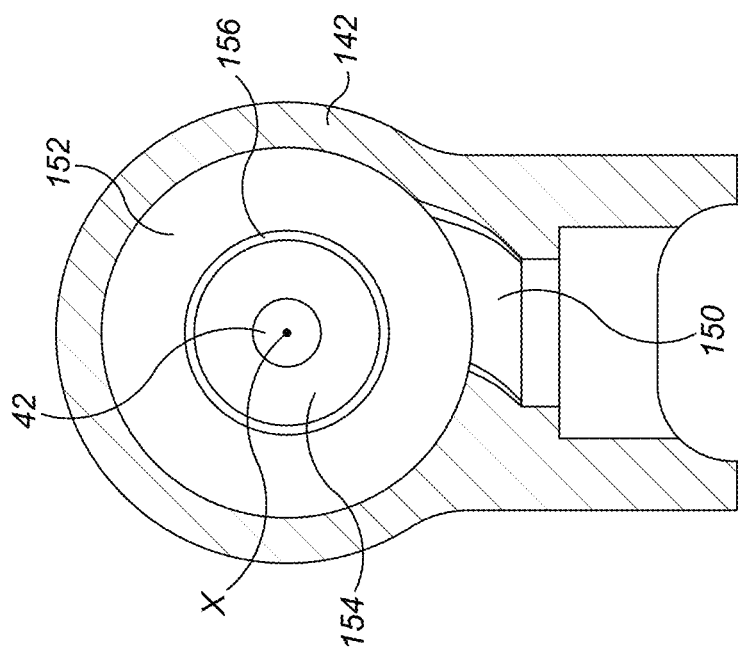
FIG. 9 is a rear sectional view through a fluid chamber of the nozzle.
Figure 8:
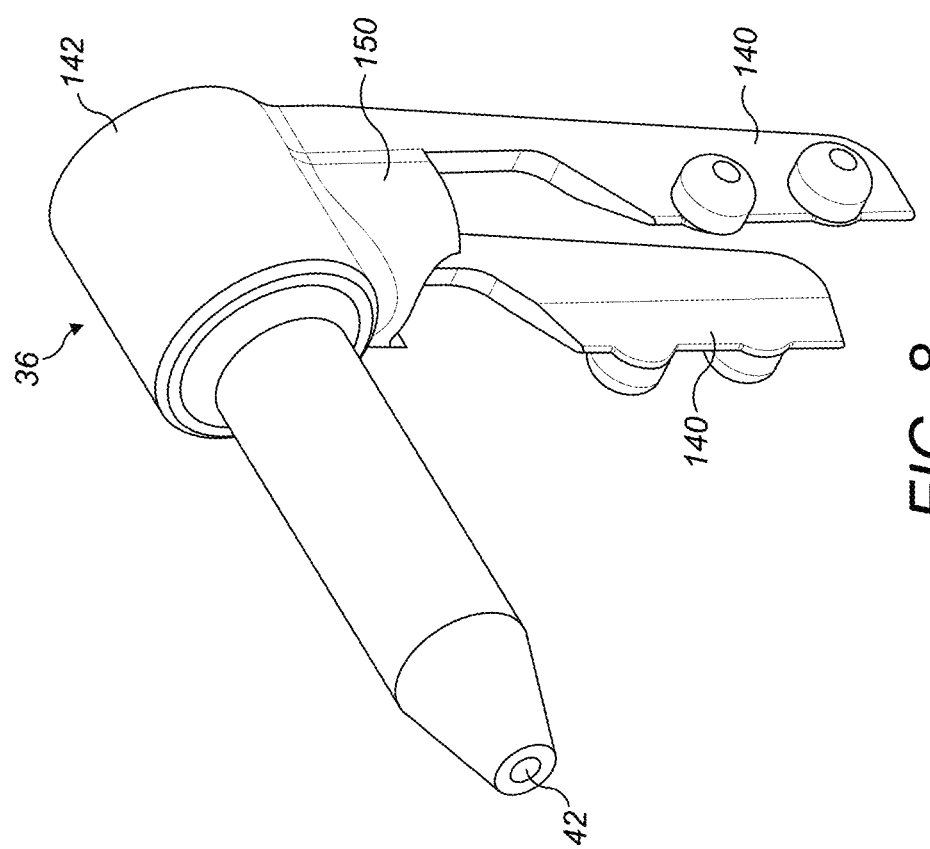
FIG. 8 is a perspective view of a nozzle of the conduit system.
Figure 10A:
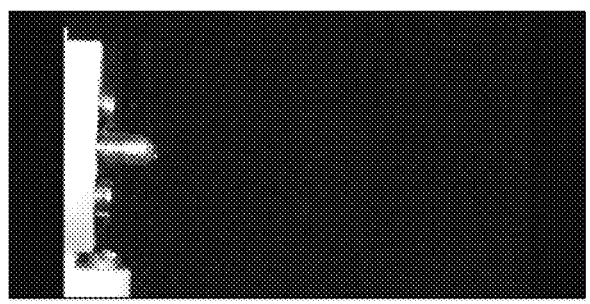
FIGS. 10(a) to 10(e) are a series of photographs showing the ejection of a burst of working fluid from the nozzle of FIG. 8.
Figure 10B:
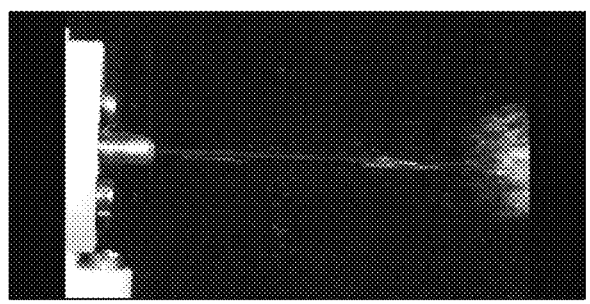
Figure 10C:
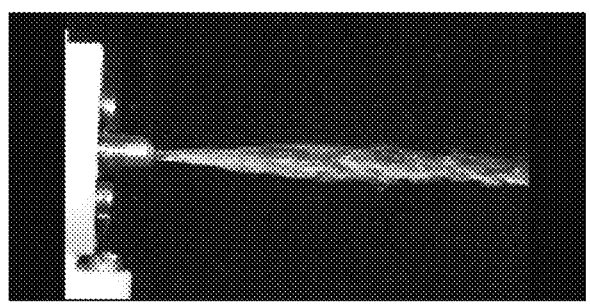
Figure 10D:
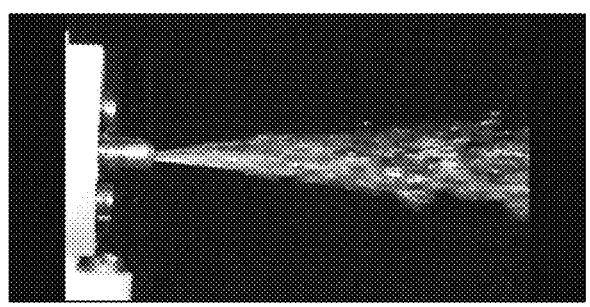
Figure 10E:
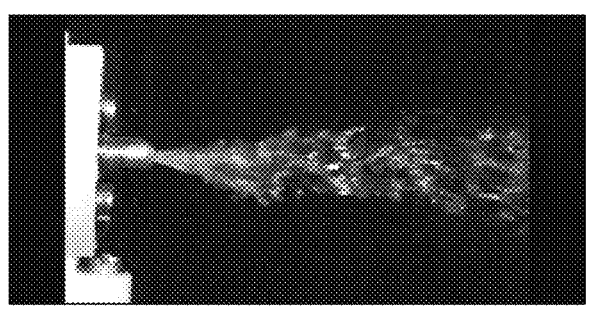
Figure 11A:
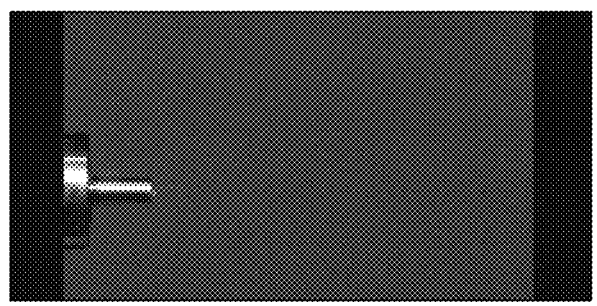
FIGS. 11(a) to 11(e) are a series of photographs showing the ejection of a burst of working fluid from a nozzle having a fluid inlet located opposite to the fluid outlet.
Figure 11B:
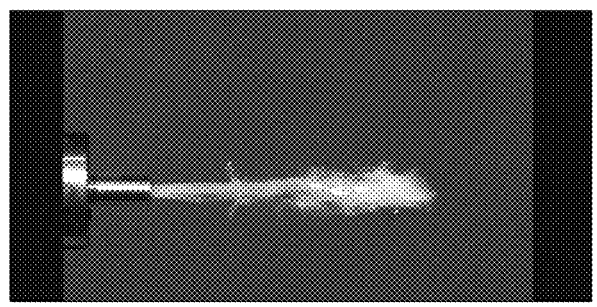
Figure 11C:
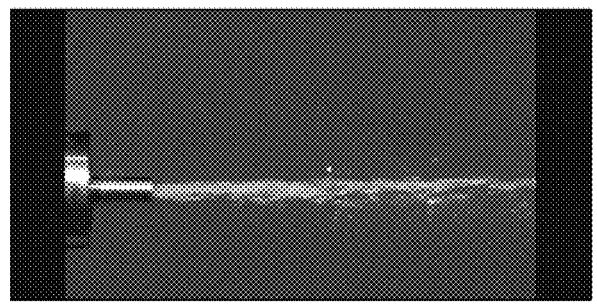
Figure 11D:
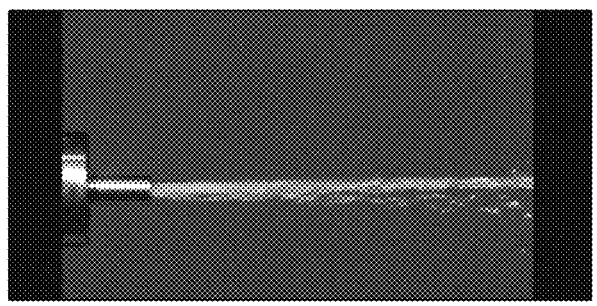
Figure 11E:
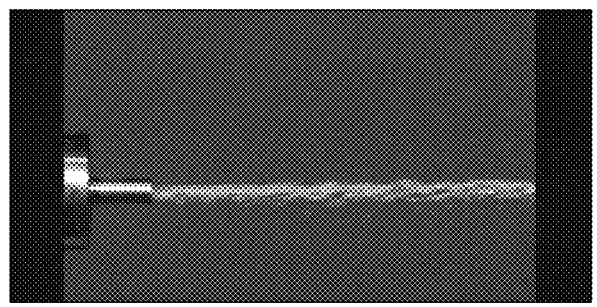

The fluid conduit 130 passes between the legs 140 of the body 142 of the nozzle 36 to connect to a fluid inlet 150 of the nozzle 36. With particular reference to FIG. 9, the fluid inlet 150 is a tangential inlet which conveys fluid tangentially into a fluid chamber 152 defined by the body 142 of the nozzle 36. In this embodiment, the fluid chamber 152 is cylindrical in shape, and extends about a longitudinal axis X which is collinear with the longitudinal axis of the nozzle 36. The diameter of the fluid chamber 152 is preferably in the range from 2 to 7 mm, and in this embodiment is around 4 mm.

The body 142 of the nozzle 36 also defines a cylindrical fluid channel 154 which is located downstream from the fluid chamber 152, and which conveys working fluid from the fluid chamber 152 to the fluid outlet 42 of the nozzle 36. The fluid channel 154 is centered on, and extends about the longitudinal axis X. The diameter of the fluid channel 154 is preferably in the range from 1.5 to 3 mm, and in this embodiment is around 2 mm. A fluid port 156 for conveying fluid from the fluid chamber 152 to the fluid channel 154 is centered on the longitudinal axis X. The fluid port 156 is frustoconical in shape, converging towards the fluid channel 154. The fluid outlet 42 of the nozzle 36 is also centered on the longitudinal axis X. The fluid outlet preferably has a diameter in the range from 0.5 to 1.5 mm, and in this embodiment is around 0.7 mm. The transition between the fluid channel 154 and the fluid outlet 42 of the nozzle 36 is preferably frustoconicial so that there is a relatively gradual reduction in the diameter of the fluid flow path between the fluid channel 154 and the fluid outlet 42.

To operate the appliance 10, the user presses buttons 18, 20, 22 located on the handle 12. The user switches on the appliance 10 by depressing button 18, the action of which is detected by the control circuit 66. The user may select a mode of operation of the appliance 10 by depressing button 20. For example, through pressing button 20 once, the control circuit 66 may activate the motor to move the brush unit 29 relative to the handle 12. Pressing that button 20 again may switch off the motor. When the button 22 is pressed, a burst of water is emitted from the nozzle 36. The control circuit 66 activates the pump 48 to urge a volume of water from a fluid chamber of the pump 48 to the nozzle 36, and to replenish the fluid chamber through drawing a volume of water from the fluid reservoir 34.

The fluid delivery system is preferably configured to generate a burst of water which has a static pressure in the range from 3 to 10 bar at the fluid inlet 150 of the nozzle 36. As the water burst enters the fluid chamber 152 through the fluid inlet 150, water droplets having both axial momentum and angular momentum are generated from the water burst due to the angled entry of the water burst into the fluid chamber 152. The water droplets pass through the fluid port 156 into the fluid channel 154, and are subsequently emitted from the fluid outlet 42 of the nozzle 36.

FIGS. 10(*a*) to 10(*e*) are a series of photographs, taken after 0 ms, 2 ms, 4 ms, 8 ms and 12 ms respectively, of the ejection of a water burst having a volume of 0.25 ml from the nozzle 36. The water ejected from the nozzle can be seen to be disrupted and in the form of a divergent spray. For comparison, FIGS. 11(*a*) to 11(*e*) are a series of similar photographs, taken after 0 ms, 2 ms, 4 ms, 8 ms and 12 ms respectively, of the ejection of the same volume of water, again ejected in the form of a burst, from a similar nozzle which has an axial inlet, that is, a fluid inlet located directly opposite to the fluid outlet, in place of a tangential inlet. Not only is there considerably less fragmentation of the water burst into water droplets, the profile of the water burst emitted from that nozzle is also narrower in comparison to that emitted from the nozzle 36 having a tangential inlet.

The invention claimed is:

1. A dental cleaning appliance comprising:
    a pump for generating a burst of working fluid having a volume that is less than 1 ml;

a control circuit for activating the pump;

a nozzle for delivering the burst of working fluid to the teeth of a user; and a fluid conduit for conveying the burst of working fluid generated by the pump to the nozzle, wherein the nozzle comprises a fluid chamber extending about a longitudinal axis for directing the burst of working fluid toward a fluid channel and a fluid outlet of the nozzle, the fluid chamber comprising a fluid inlet configured to direct working fluid into the fluid chamber off-center with respect to the longitudinal axis to generate angular momentum about the longitudinal axis in the burst of working fluid to cause the burst of working fluid to break up to form a divergent spray of droplets that is delivered to the teeth of the user;

wherein the fluid chamber has a larger diameter than the fluid channel, the fluid channel has a larger cylindrical shape than the fluid outlet, and the nozzle further comprises a first internal frustoconical transition between the fluid chamber and the fluid channel and a second internal frustoconical transition between the fluid channel and the fluid outlet.

2. The appliance of claim 1, wherein the fluid inlet is arranged to convey the fluid into the fluid chamber along a path which is located in a plane which is substantially orthogonal to the longitudinal axis.

3. The appliance of claim 2, wherein the path is spaced from the longitudinal axis.

4. The appliance of claim 1, wherein the fluid inlet is arranged to convey the fluid into the fluid chamber along a path which is spaced from the longitudinal axis.

5. The appliance of claim 1, wherein the fluid inlet comprises a tangential inlet for conveying the fluid substantially tangentially into the fluid chamber.

6. The appliance of claim 1, wherein the fluid chamber has, in a plane which is orthogonal to the longitudinal axis, a cross-section which is substantially circular in shape.

7. The appliance of claim 6, wherein the diameter of the fluid chamber is in the range from 2 to 7 mm.

8. The appliance of claim 6, wherein the fluid chamber has an outlet port located on the longitudinal axis of the fluid chamber.

9. The appliance of claim 8, wherein the outlet port is in axial alignment with the outlet of the nozzle.

10. The appliance of claim 9, wherein the outlet port is frustoconical in shape.

11. The appliance of claim 1, wherein the fluid outlet has a diameter in the range from 0.5 to 1.5 mm.

12. The appliance of claim 1, wherein the nozzle and the fluid conduit form part of a fluid delivery system configured to deliver working fluid to the inlet of the fluid chamber at a static pressure in the range from 3 to 10 bar.

13. The appliance of claim 1, comprising a handle, and wherein the nozzle is moveable relative to the handle.

14. The appliance of claim 13, wherein the nozzle is moveable relative to the handle about a movement axis.

15. The appliance of claim 14, wherein the nozzle is pivotable about the movement axis.

16. The appliance of claim 14, comprising a nozzle support configured for movement about the movement axis.

17. The appliance of claim 16, wherein the nozzle support is pivotable about the movement axis.

18. The appliance of claim 14, wherein the movement axis is angled to the longitudinal axis of the handle.

19. The appliance of claim 18, wherein the movement axis is substantially orthogonal to the longitudinal axis of the handle.

20. The appliance of claim 14, wherein the movement axis is spaced from the longitudinal axis of the fluid chamber.

21. The appliance of claim 20, wherein the movement axis is angled to the longitudinal axis of the fluid chamber.

22. The appliance of claim 21, wherein the movement axis is substantially orthogonal to the longitudinal axis of the fluid chamber.

23. The appliance of claim 13, wherein the nozzle is biased for movement in a direction which urges the nozzle against the teeth of the user during use of the appliance.

24. The appliance of claim 23, wherein the nozzle is biased for movement in said direction by a resilient member forming part of a fluid delivery system.

25. The appliance of claim 13, comprising a head, and a stem extending between the head and the handle, and wherein the nozzle protrudes from the head.

26. The appliance of claim 25, wherein the nozzle is moveable relative to the head.

27. The appliance of claim 26, wherein the nozzle is biased for movement relative to the handle in a direction which urges the nozzle to move in a direction extending away from the head.

28. The appliance of claim 26, wherein the nozzle is moveable relative to the head between a distal position and a proximal position relative to the head.

29. The appliance of claim 26, wherein the head comprises engagements that engage the teeth of the user during use of the appliance, and wherein the nozzle is moveable relative to the engagements.

* * * * *